United States Patent
Schmitz-Stapela et al.

(10) Patent No.: US 10,717,906 B2
(45) Date of Patent: Jul. 21, 2020

(54) SELF-ADHESIVE COMPOUND AND USE THEREOF IN AN ADHESIVE TAPE

(71) Applicant: TESA SE, Norderstedt (DE)

(72) Inventors: Daniel Schmitz-Stapela, Hamburg (DE); Thorsten Krawinkel, Hamburg (DE); Thilo Dollase, Hamburg (DE); Anika Petersen, Bimöhlen (DE); Tanja Altenwegner, Hamburg (DE); Andreas Westphal, Neu Wulmstorf (DE)

(73) Assignee: TESA SE, Norderstedt (DE)

( * ) Notice: Subject to any disclaimer, the term of this patent is extended or adjusted under 35 U.S.C. 154(b) by 47 days.

(21) Appl. No.: 16/172,061

(22) Filed: Oct. 26, 2018

(65) Prior Publication Data
US 2019/0062610 A1    Feb. 28, 2019

Related U.S. Application Data

(62) Division of application No. 14/780,879, filed as application No. PCT/EP2014/056664 on Apr. 3, 2014, now abandoned.

(30) Foreign Application Priority Data

Apr. 15, 2013   (DE) .................. 10 2013 206 624

(51) Int. Cl.
| | |
|---|---|
| *C09J 153/02* | (2006.01) |
| *C09J 11/06* | (2006.01) |
| *B32B 7/12* | (2006.01) |
| *C09J 7/38* | (2018.01) |
| *C08L 53/02* | (2006.01) |
| *C08L 57/02* | (2006.01) |
| *C08K 5/105* | (2006.01) |
| *C08K 5/3435* | (2006.01) |
| *C08K 5/3475* | (2006.01) |

(52) U.S. Cl.
CPC ............... *C09J 153/02* (2013.01); *B32B 7/12* (2013.01); *C08K 5/105* (2013.01); *C08K 5/3435* (2013.01); *C08K 5/3475* (2013.01); *C08L 53/02* (2013.01); *C08L 57/02* (2013.01); *C09J 7/387* (2018.01); *C09J 11/06* (2013.01); *C09J 2453/003* (2013.01)

(58) Field of Classification Search
CPC ........... C08L 53/02; C09J 153/02; C09J 7/387
See application file for complete search history.

(56) References Cited

U.S. PATENT DOCUMENTS

| | | | |
|---|---|---|---|
| 4,024,312 A | 5/1977 | Korpman | |
| 4,358,489 A * | 11/1982 | Green ................. | C09J 7/26 428/31 |
| 4,654,389 A * | 3/1987 | Graham ............... | C09J 123/08 524/272 |
| 5,135,978 A | 8/1992 | Sasaki | |
| 5,409,189 A | 4/1995 | Lühmann | |
| 5,491,012 A | 2/1996 | Lühmann | |
| 5,507,464 A | 4/1996 | Hamerski et al. | |
| 5,516,584 A * | 5/1996 | Blitstein ............... | B32B 25/00 428/35.9 |
| 5,626,931 A | 5/1997 | Lühmann et al. | |
| 5,626,932 A | 5/1997 | Lühmann et al. | |
| 5,672,402 A | 9/1997 | Kreckel et al. | |
| 5,897,949 A | 4/1999 | Lühmann | |
| 5,925,459 A | 7/1999 | Zimmermann et al. | |
| 5,967,474 A | 10/1999 | Docanto et al. | |
| 6,004,665 A | 12/1999 | Lühmann et al. | |
| 6,086,973 A | 7/2000 | Hazes | |
| 6,106,953 A | 8/2000 | Zimmermann et al. | |
| 6,284,378 B1 | 9/2001 | Junghans et al. | |
| 6,342,720 B1 | 1/2002 | Presting et al. | |
| 6,372,335 B1 | 4/2002 | Lühmann et al. | |
| 6,395,389 B1 | 5/2002 | Lühmann et al. | |
| 6,544,639 B1 | 4/2003 | Lühmann et al. | |
| 6,569,521 B1 | 5/2003 | Sheridan et al. | |
| 6,723,407 B2 | 4/2004 | Dollase et al. | |
| 6,874,740 B1 | 4/2005 | Leiber et al. | |
| 7,309,524 B2 | 12/2007 | Krawinkel | |
| 2002/0017359 A1 | 2/2002 | Luhmann et al. | |
| 2002/0034628 A1 | 3/2002 | Luhmann et al. | |
| 2002/0168516 A1 | 11/2002 | Luhmann et al. | |

(Continued)

FOREIGN PATENT DOCUMENTS

| | | |
|---|---|---|
| DE | 33 31 016 C1 | 10/1984 |
| DE | 42 22 849 C1 | 6/1993 |

(Continued)

OTHER PUBLICATIONS

International Search Report dated May 7, 2014, dated May 13, 2014.

(Continued)

*Primary Examiner* — Jeffrey C Mullis
(74) *Attorney, Agent, or Firm* — Norris McLaughlin, P.A.

(57) ABSTRACT

A single- or double-sidedly bonding adhesive-sheet strip having a self-adhesive composition comprising a) at least one elastomer, at least one type of polybutadiene block copolymer being used as an elastomer, b) at least one partially hydrogenated hydrocarbon resin having a softening temperature of at least 90° C., c) at least one additional hydrocarbon resin, a terpene phenol resin and/or a colophonium resin having a softening temperature of at least 90° C., d) an optional soft resin, and e) additional additives as applicable.

22 Claims, 7 Drawing Sheets

(56) References Cited

U.S. PATENT DOCUMENTS

| | | | |
|---|---|---|---|
| 2003/0215660 A1* | 11/2003 | Krawinkel | C08F 287/00 428/515 |
| 2004/0092663 A1 | 5/2004 | Krawinkel | |
| 2004/0110882 A1 | 6/2004 | Krawinkel et al. | |
| 2005/0176842 A1* | 8/2005 | Graichen | C08F 290/06 522/178 |
| 2008/0214078 A1 | 9/2008 | Vanmarcke et al. | |
| 2009/0220715 A1* | 9/2009 | Werink | B29C 49/0005 428/35.7 |
| 2012/0111494 A1 | 5/2012 | Krawinkel et al. | |
| 2012/0251757 A1* | 10/2012 | Dalmis | C09J 5/00 428/41.8 |
| 2013/0108408 A1 | 5/2013 | Saison et al. | |
| 2016/0167339 A1* | 6/2016 | Dollase | C08L 25/10 428/522 |

FOREIGN PATENT DOCUMENTS

| | | |
|---|---|---|
| DE | 42 33 872 A1 | 3/1994 |
| DE | 44 28 587 A1 | 2/1996 |
| DE | 44 31 914 A1 | 3/1996 |
| DE | 195 11 288 A1 | 10/1996 |
| DE | 195 31 696 A1 | 3/1997 |
| DE | 197 08 366 A1 | 1/1998 |
| DE | 196 49 636 A1 | 6/1998 |
| DE | 196 49 727 A1 | 6/1998 |
| DE | 196 49 728 A1 | 6/1998 |
| DE | 196 49 729 A1 | 6/1998 |
| DE | 197 08 364 A1 | 9/1998 |
| DE | 197 20 145 A1 | 11/1998 |
| DE | 197 23 177 A1 | 12/1998 |
| DE | 197 56 816 C1 | 2/1999 |
| DE | 197 56 084 A1 | 7/1999 |
| DE | 198 20 854 C1 | 8/1999 |
| DE | 198 42 864 A1 | 3/2000 |
| DE | 198 42 865 A1 | 3/2000 |
| DE | 100 03 318 A1 | 8/2001 |
| DE | 10 2007 021 504 A1 | 11/2008 |
| DE | 10 2012 223 670 A1 | 6/2014 |
| EP | 0 816 458 B1 | 9/2002 |
| EP | 0 816 459 B1 | 9/2002 |
| EP | 0 885 571 B1 | 8/2003 |
| EP | 0 878 525 B1 | 9/2003 |
| EP | 1 341 862 B1 | 9/2003 |
| EP | 1 418 212 A1 | 5/2004 |
| EP | 1 418 215 A1 | 5/2004 |
| JP | 2002-037975 A | 2/2002 |
| JP | 2002-105413 A | 4/2002 |
| JP | 4507036 B2 | 7/2010 |
| WO | 92/01132 A1 | 1/1992 |
| WO | 92/11333 A1 | 7/1992 |
| WO | 94/21157 A1 | 9/1994 |
| WO | 95/06691 A1 | 3/1995 |
| WO | 97/07172 A1 | 2/1997 |
| WO | 98/03601 A1 | 1/1998 |
| WO | 99/31193 A1 | 6/1999 |
| WO | 99/37729 A1 | 7/1999 |
| WO | 99/63018 A1 | 12/1999 |
| WO | 2006/115861 A1 | 11/2006 |
| WO | 2009/114683 A1 | 9/2009 |
| WO | 2010/077435 A1 | 7/2010 |
| WO | 2010/077541 A1 | 7/2010 |
| WO | 2010/078346 A2 | 7/2010 |
| WO | 2010/078396 A1 | 7/2010 |
| WO | 2011/124782 A1 | 10/2011 |

OTHER PUBLICATIONS

English Translation Office Action of corresponding Japanese Application No. 2016-508073, dated Jan. 9, 2018.
English Translation Office Action of corresponding Japanese Application No. 2016-508073, dated Jun. 29, 2018.

* cited by examiner

SELF-ADHESIVE COMPOUND AND USE THEREOF IN AN ADHESIVE TAPE

This is a divisional patent application of U.S. Ser. No. 14/780,879 which was filed on Sep. 28, 2015, which in turn was a 371 application of PCT/EP2014/056664 filed 3 Apr. 2014, which claims foreign priority benefit under 35 U.S.C. 119 of German Patent Application 10 2013 206 624.4 filed Apr. 15, 2013, the entire contents of which are incorporated herein by reference.

The invention relates to a pressure-sensitive adhesive and also to the use thereof in a pressure-sensitive adhesive strip comprising at least one layer, which is redetachable without residue or destruction by extensive stretching substantially in the bond plane.

BACKGROUND OF THE INVENTION

Pressure-sensitive adhesives (PSAs) are adhesives which permit a durable join to the substrate even under relatively weak applied pressure and which after use can be detached from the substrate again substantially without residue. At room temperature, PSAs have a permanently pressure-sensitively adhesive effect, hence having a sufficiently low viscosity and a high initial tack, so that they wet the surface of the particular bonding base even under low applied pressure. The bondability of the adhesives derives from their adhesive properties, and the redetachability from their cohesive properties.

Included in particular under this heading are compounds which possess pressure-sensitively adhesive properties in accordance with the "Handbook of Pressure Sensitive Adhesive Technology" by Donatas Satas (Satas & Associates, Warwick 1999), especially those which meet the Dahlquist criterion.

Elastically or plastically highly extensible pressure-sensitive adhesive strips which can be detached again without residue or destruction by extensive stretching in the bond plane are known from, for example, U.S. Pat. No. 4,024,312 A, DE 33 31 016 C2, WO 92/01132 A1, WO 92/11333 A1, DE 42 22 849 A1, WO 95/06691 A1, DE 195 31 696 A1, DE 196 26 870 A1, DE 196 49 727 A1, DE 196 49 728 A1, DE 196 49 729 A1, DE 197 08 364 A1, DE 197 20 145 A1, DE 198 20 854 A1 and DE 100 03 318 A1, and are also referred to below as strippable pressure-sensitive adhesive strips.

Strippable self-adhesive tapes of this kind are used frequently in the form of single- or double-sidedly pressure-sensitively adhesive adhesive-sheet strips, which preferably have a nonpressure-sensitively adhesive grip region, from which the detachment operation is initiated.

Fields of use of aforesaid strippable pressure-sensitive adhesive strips include in particular the residueless and nondestructively redetachable fixing of light to moderately heavy articles in the home, workplace, and office. In these applications they replace conventional fastening means such as, for example, drawing pins, roundhead needles, thumb tacks, nails, screws, conventional self-adhesive tapes, and liquid adhesives. Key to the successful use of the pressure-sensitive adhesive strips is not only the possibility of residueless and nondestructive redetachment of bonded articles, but also their quick and easy bonding and also their secure hold for the envisaged period of bonding. It should be borne in mind in particular here that the adhesive strips must function on a large number of substrates, in order to be able to serve as a universal fixing in the home, workplace, and office.

Pressure-sensitive adhesive strips of these kinds are available commercially, in the form of the tesa Powerstrips® and 3M Command Adhesives.

Very high holding performance has been realizable to date, commercially, only with styrene block copolymer-based PSAs. These styrene block copolymers always include unsaturated polydiene blocks. Polydienes are intrinsically susceptible to thermooxidative aging and may be damaged by radiation and ozone.

A further key aspect of such strips, especially when they are to be used on transparent surfaces such as windows, is their transparency.

tesa markets strippable transparent products with moderate holding performance as tesa Powerstrips® Deco. 3M offers transparent adhesive strips featuring a holding performance of up to 900 g.

Approaches to creating transparent strippable adhesive products include the utilization of styrene block copolymers which comprise hydrogenated polydiene blocks (DE 10 2007 021 504 A1 and U.S. Pat. No. 7,309,524 B). Although high transparency and improved aging stability are possible with the solution outlined, the requisitely high bonding performances, and especially the tear resistance, are not achievable via these formulation approaches.

EP 1 418 212 A1 describes transparent adhesive strips, redetachable without residue or destruction, which are of triple-ply design. In this arrangement, the middle layer contributes the major part of the mechanical properties to the product properties, but is unstable toward UV light and ozone on account of its formulation. The outer layers take on a filter function for ozone and UV light. A disadvantage of this approach is its multilayerness, which necessitates a multistage production process. Furthermore, the achievable holding performances are limited due to the adhesive formulation forming the outer layers.

Also known are polyacrylate-based systems (WO 2010/077541 A1; WO 2010/078346 A1; WO 2010/077435 A1; U.S. Pat. No. 6,723,407 B1), and there are also descriptions of polysiloxane-based adhesive strips, including in U.S. Pat. No. 6,569,521 B1 and WO 2009/114683 A1. Advantages are their optical properties and the resistance. The tension/extension properties and the balance between holding performance and bonding performance, however, are not at a level allowing high-performance adhesive strips to be produced. In some such cases, sufficient tear strengths are achievable only through use of a carrier.

Multilayer products or those which include carriers always have the disadvantage either that highly specific machines are required for production, or that a multiplicity of individual process steps have to be carried out. Both of these are detrimental to the production costs.

The object is therefore to provide pressure-sensitive adhesives which exhibit high holding and bonding performance, high transparency, minimal tinting, and sufficient stability with respect to light, heat, and ozone, and sufficient tear strength, and also self-adhesive products comprising such pressure-sensitive adhesives. Corresponding self-adhesive products are preferably of single-layer (carrier-free) design.

This object is achieved by means of a pressure-sensitive adhesive as recorded in the main claims. The dependent claims provide advantageous developments of the pressure-sensitive adhesive, and uses of the pressure-sensitive adhesive in pressure-sensitive adhesive strips.

SUMMARY OF THE INVENTION

The invention relates accordingly to a pressure-sensitive adhesive at least comprising
- (a) at least one elastomer, the elastomer having a fraction of at least 40 wt %, based on the adhesive composition, and elastomer used comprising at least one kind of a polybutadiene block copolymer,
- (b) at least one partly hydrogenated hydrocarbon resin (resin kind 1) having a softening temperature of at least 90° C.,
- (c) optionally at least one further hydrocarbon resin, a terpene-phenolic resin and/or a rosin having a softening temperature of at least 90° C. (resin kind 2),
- (d) optionally a plasticizing resin,
- (e) optionally further additives.

The invention further relates to a pressure-sensitive adhesive at least comprising
- (a) at least one elastomer, the elastomer having a fraction of at least 40 wt %, based on the adhesive composition, and elastomer used comprising at least one kind of a polybutadiene block copolymer,
- (b) at least one nonhydrogenated hydrocarbon resin (resin kind 1) having a softening temperature of at least 90° C.,
- (c) at least one further at least partly hydrogenated or disproportionated hydrocarbon resin, terpene-phenolic resin and/or rosin having a softening temperature of at least 90° C. (resin kind 2),
- (d) optionally a plasticizing resin,
- (e) optionally further additives.

DETAILED DESCRIPTION

The pressure-sensitive adhesive (PSA) is advantageously formulated such that it has a specific viscoelastic behavior. Viscoelastic behavior is displayed by many polymers and all PSAs. Their mechanical properties are distinguished by a combination of elastic and viscous components (regarding the viscoelasticity, see, for example, J. D. Ferry, Viscoelastic Properties of Polymers, $3^{rd}$ edn., 1980, J. Wiley, Hoboken, pages 1 to 3). The reason for this is the required ozone resistance, which in the case of extensible materials is dependent not only on the chemical properties of the formula ingredients (K. W. Ho, J. Polym. Sci. A—Polym. Chem., 1986, 24, pages 2467 to 2482) and the effect of any ozone protectants (H. Fries, Gummi Fasern Kunststoffe, 1987, 40, pages 238 to 257; R. F. Ohm, Rubber World, 1993, 208, pages 18 to 22) but also on the mechanical properties (M. Braden, A .N. Gent, J. Appl. Polym. Sci., 1960, 3, pages 90 to 99).

The ozone resistance is particularly relevant for the detachment of the adhesive strips. Where detachment takes place with extension, thereby permitting substrate destruction and residues of adhesive to be avoided, a high tear strength on the part of the adhesive strips is a desideratum. The tear strength can be adjusted effectively through block copolymers, but ozone damage may exert a significantly adverse effect on the susceptibility to tearing.

The usual ways of improving ozone resistance in rubber formulations are not suitable for transparent adhesive strips. For instance, additivation with waxes, which form a thin surface film over the rubber formulation that acts as a barrier toward ozone, causes a reduction in the self-adhesive properties of the adhesive strip. Chemical antiozonants are always colored, and, added even in small amounts, lead to perceptible tinting of the transparent adhesive strips. Polybutadiene-based block copolymers are distinguished overall by better aging stability than polyisoprene-based systems, and so formulations of the invention comprise polybutadiene-based block copolymers as an elastomer component.

According to the teaching of Gent (M. Braden, A. N. Gent, J. Appl. Polym. Sci., 1960, 3, pages 90 to 99), the viscoelastic properties also have an influence on ozone resistance. For systems comprising polybutadiene block copolymer, this can be illustrated by looking at the ozone resistance of pure (unformulated) polybutadiene block copolymers and comparing the results with adhesives which comprise polybutadiene block copolymers that are the same but are already formulated with tackifying resins. On account of their double bonds present in the polybutadiene blocks, the pure polybutadiene block copolymers are chemically reactive toward ozone (K. W. Ho, J. Polym. Sci. A—Polym. Chem., 1986, 24, pages 2467 to 2468). An assumed possible mechanism is that known as the Criegee mechanism, via which attack on the main-chain double bond may be accompanied by chain scission within the polybutadiene block.

For the more precise description and quantification of the extent of elastic and viscous components, and also of the ratio of the components to one another, it is possible to employ the variables of storage modulus (G'), loss modulus (G"), and the ratio G"/G', identified as loss factor tan δ (tan delta), which can be determined by Dynamic Mechanical Analysis (DMA) (see test J). G' is a measure of the elastic component, G" a measure of the viscous component of a substance. Both variables are dependent on the deformation frequency and the temperature.

The loss factor tan δ is a measure of the elasticity and the flow capacity of the substance under investigation.

The variables can be determined using a rheometer. In this case, the material under investigation is exposed to a sinusoidally oscillating shearing stress in, for example, a plate/plate arrangement. In the case of instruments operating with shear stress control, the deformation is measured as a function of time, and the time offset of this deformation γ (gamma) relative to the introduction of the shearing stress τ (tau) is measured. This time offset (phase shift between shear stress vector and deformation vector) is identified as phase angle δ (delta). The derivations are as follows:

| | |
|---|---|
| Storage modulus G' | $G' = \tau/\gamma \cdot \cos(\delta)$ |
| Loss modulus G" | $G'' = \tau/\gamma \cdot \sin(\delta)$ |
| Loss factor tan δ | $\tan \delta = G'/G''$ |

The reports of the aforementioned parameters within this specification pertain to measurement by means of a rheometer in plate-on-plate configuration, based on a circular sample having a diameter of 25 mm and a thickness of 1 mm. The temperature is 25° C.; otherwise, standard conditions prevail.

In accordance with the invention, it was unpredictably found that adhesive formulations for transparent, residuelessly redetachment-free adhesive strips are advantageous in respect not only of technical adhesive properties but also application-relevant ozone resistance when they exhibit a specific viscoeleastic behavior, having been formulated in fact such that the tan δ at application temperature (here 25° C.) at 10 rad/s (frequency of the oscillating shearing stress) is at least 0.20 and at 100 rad/s is at least 0.40 (according to test J). Preferably, the tan δ at application temperature (here 25° C.) at 10 rad/s is not more than 0.40 and at 100 rad/s is not more than 1.00.

An elastomer employed comprises, to an extent of at least 90 wt % (based on the total elastomer amount), a polybutadiene block copolymer or a mixture of different polybutadiene block copolymers. This polybutadiene block copolymer or these polybutadiene block copolymers are copolymers comprising polymer blocks predominantly formed by vinylaromatics (A blocks), preferably styrene, and those predominantly formed by polymerization of 1,3-butadiene (B blocks). The polybutadiene block copolymer is not hydrogenated in the polybutadiene block.

According to one preferred embodiment of the invention, at least one polybutadiene block copolymer is a triblock copolymer or a higher multiblock copolymer having at least two A blocks. As a triblock copolymer, it may have a linear A-B-A structure. Likewise possible for use are block copolymers of radial architecture, and also star-shaped and linear multiblock copolymers. All of the aforementioned polymers may be utilized alone or in a mixture with one another. Further components present may be A-B diblock copolymers. The weight-average molar mass of the block copolymers is customarily between 50 000 g/mol and 500 000 g/mol, preferably between 75 000 g/mol and 200 000 g/mol.

The block copolymers of the PSAs preferably possess polystyrene end blocks as A blocks. Instead of the preferred polystyrene blocks, polymer blocks based on other aromatic-containing homopolymers and copolymers as vinylaromatics (preferably $C_8$ to $C_{12}$ aromatics), having glass transition temperatures of greater than 75° C., may also be utilized, such as α-methylstyrene-containing aromatic blocks, for example. Identical or different A blocks may also be included, furthermore. Glass transition temperatures are determined according to test L.

In the context of this invention, A blocks are also referred to as "hard blocks". B blocks, correspondingly, are also called "soft blocks" or "elastomer blocks". This reflects the inventive selection of the blocks in line with their glass transition temperatures (for A blocks at least 40° C., more particularly at least 60° C., and for B blocks up to −50° C., more particularly not more than −80° C.). These figures pertain to the pure, unblended block copolymers.

In one advantageous embodiment, the polybutadiene block copolymers have a polyvinylaromatic fraction of 20 wt % to 40 wt %, preferably between 25 wt % and 35 wt %. Too low a polyvinylaromatic fraction leads to inadequate physical crosslinking, caused by microphase separation within the polybutadiene block copolymers. The physical crosslinking is important for the holding performance and the tear strength. In the case of too high a polyvinlylaromatic fraction, on the other hand, the adhesive loses tack.

The polybutadiene block copolymers resulting from the A and B blocks may comprise identical or different B blocks, in terms of microstructure (relative ratio of the forms of monomer linkage possible for polybutadiene, 1,4-cis, 1,4-trans, and 1,2-vinyl: preference is given to a 1,4-fraction (cis+trans) of >75%, very preferably of >90%, based on the polybutadiene blocks, and a 1,4-cis fraction of >40%, based on the polybutadiene blocks) and/or of chain length. A high fraction of 1,4-linkage and especially 1,4-cis-linkage on the part of the monomer units in the polybutadiene blocks results in advantageous tension/extension characteristics, resulting in sufficient extensibility, which is important for the residueless redetachment under stretching.

In a further preferred embodiment, the fraction of the polybutadiene block copolymers, more particularly polystyrene-polybutadiene block copolymers, in total, based on the overall pressure-sensitive adhesive, is at least 40 wt %, preferably at least 45 wt %. A result of an inadequate fraction of polybutadiene block copolymers is that the cohesion of the PSA is relatively low and, for example, the tip-shear test is no longer passed.

The maximum fraction of the polybutadiene block copolymers, more particularly polystyrene-polybutadiene block copolymers, in total, based on the overall pressure-sensitive adhesive, is not more than 60 wt %, preferably not more than 55 wt %. Too high a fraction of polybutadiene block copolymers may have the consequence, in turn, that the PSA is barely still pressure-sensitively adhesive.

Great preference is given to using an elastomer mixture which, based on the total amount of elastomer used, comprises at least 50 wt %, preferably at least 60 wt %, of A-B-A triblock copolymer and, as a complement, 50 wt % or, as a preferred complement, 40 wt % of A-B diblock copolymer.

Surprisingly, by means of polybutadiene block copolymer-based adhesives (in suitable combination with the other ingredients required according to the invention), the requirements can be met not only in terms of holding and bonding performance, residueless redetachability, and optical properties, but also in respect of resistance (oxidative aging), despite the fact that the polybutadiene block copolymers are unsaturated compounds, if formulation takes place in accordance with the invention and, in particular, there is a correspondingly advantageous viscoelastic behavior present.

Employed as tackifying resin kind 1 is a hydrocarbon resin. The selection of the tackifying resin kind 1 influences the tinting of the adhesive formulation, its resistance, and the compatibility with the remaining formulation ingredients, especially the polybutadiene block copolymer-based elastomer.

Tackifying resin kind 1 includes nonhydrogenated and preferably partly hydrogenated hydrocarbon resins having a softening temperature (Ring & Ball) of at least 90° C. and preferably of not more than 125° C. Very preferably the softening temperature is at least 95° C. and not more than 115° C.

Examples of representatives of tackifying resin kind 1 include hydrogenated and nonhydrogenated polymers of dicyclopentadiene, nonhydrogenated, partially hydrogenated or selectively hydrogenated hydrocarbon resins based on $C_5$, $C_5/C_9$ or $C_9$ monomer streams, polyterpene resins based on α-pinene and/or β-pinene and/or δ-limonene. Hydrocarbon resins preferably have a Gardener value of <1. The Gardener value is determined according to ASTM D1544. It involves dissolving 50 wt % of resin in 50 wt % of toluene and investigating the color using reference specimens.

Tackifying resins of tackifying resin kind 1 having a softening temperature of not more than 110° C. have a degree of hydrogenation of between 90% and 0% (where 100% means fully hydrogenated and 0% nonhydrogenated), preferably between 90% and 50%. Tackifying resins of tackifying resin kind 1 having a softening temperature of greater than 110° C. have a degree of hydrogenation of between 70% and 0%, preferably between 70% and 50%.

The selection of the correct degree of hydrogenation is important in relation to the compatibility of the tackifying resins with the elastomers.

Tackifying resin kind 1, where it comprises a partly hydrogenated tackifying resin, is employed, according to a further preferred embodiment of the invention, in a fraction of at least 25 wt % and not more than 60 wt %, preferably at least 30 wt % and not more than 50 wt % (based on the adhesive composition).

Tackifying resin kind 1, where it comprises a nonhydrogenated tackifying resin, is employed, according to a further preferred embodiment of the invention, in a fraction of at least 15 wt % and not more than 30 wt %, preferably at least 18 wt % and not more than 28 wt % (based on the adhesive composition).

Tackifying resin kind 2 is employed depending on the selection of tackifying resin kind 1.

Employed as tackifying resin kind 2 is a hydrocarbon resin (nonhydrogenated, partly or fully hydrogenated), a terpene-phenolic resin or a rosin (nondisproportionated or disproportionated, partly or fully hydrogenated). Tackifying resin kind 2 substantially influences the balance between holding performance (cohesion) and bonding performance (adhesion).

The degree of hydrogenation of the tackifying resins of tackifying resin kind 2 is at least 0% and not more than 100%, preferably not more than 70%. If the resin is unhydrogenated or only slightly hydrogenated, then typically as little as possible is used, since otherwise there may be tinting of the adhesive.

Resins of tackifying resin kind 2 have a softening temperature of at least 90° C. and preferably not more than 115° C.

Tackifying resins of tackifying resin kind 2 having a softening temperature of at least 90° C. and not more than 105° C. are employed up to a proportion of amount of resin kind 1 to amount of resin kind 2 of 1:1.

Tackifying resins of tackifying resin kind 2 having a softening temperature of >105° C. are employed (based on the total adhesive) in a proportion of not more than 25 wt %, preferably not more than 15 wt %.

If a resin having a softening temperature of not more than 110° C. is used as tackifying resin kind 1, then there is no need for tackifying resin kind 2, though it can be selected in order to carry out fine-tuning of the technical adhesive properties in accordance with requirements.

At least one of the resins of resin kind 1 and resin kind 2 is partly hydrogenated. The proportion of partly hydrogenated resin in the total adhesive is preferably at least 25 wt %, very preferably at least 30 wt %.

Where only one tackifying resin is employed, it is a partly hydrogenated type.

The total tackifying resin content of the adhesive is at least 30 wt %, preferably at least 40 wt %, and not more than 60 wt %, preferably not more than 50 wt %.

The plasticizing resin serves for the final fine-tuning of the cohesion/adhesion balance. Very preferably it comprises a plasticizing resin or plasticizing-resin mixture having a melt viscosity at 25° C. and 1 Hz of at least 25 Pa*s, preferably of at least 50 Pa*s, and a softening temperature of <25° C. The melt viscosity is determined according to test K. The plasticizing resin may very preferably be a hydrocarbon-based or a rosin-based plasticizing resin. In relation to the total adhesive formulation, the plasticizing resin or plasticizing-resin mixture is employed with a fraction of 0 wt % and not more than 6 wt %, based on the total adhesive composition.

Protectants in particular may be added as further additives to the adhesive. They include primary and secondary aging inhibitors, light and UV stabilizers, and flame retardants, and also fillers, provided the optical properties still meet the stated requirements. Typical amounts for use of an additive are up to 1 wt %, based on the total adhesive composition. Particularly advantageous are aging inhibitors which leave behind no colored residues on bonding substrates (in this regard, see the prior art in EP 1 341 862 B1). Fillers can be added at higher levels, typically in a fraction of up to 5 wt %, based on the total adhesive composition.

The following may typically be utilized as additives:

- plasticizing agents such as, for example, plasticizer oils, or low molecular mass liquid polymers, such as low molecular mass polybutenes, for example
- primary antioxidants such as sterically hindered phenols, for example
- secondary antioxidants, such as phosphites or thioethers, for example
- process stabilizers such as C-radical scavengers, for example
- flame retardants
- light stabilizers such as UV absorbers or sterically hindered amines, for example
- dyes
- processing aids
- (nano)fillers such as, for example, silicon dioxide, aluminum oxide, titanium dioxide, or phyllosilicates, and also color pigments and dyes (for transparent versions nevertheless with specific coloration), and also optical brighteners
- endblock reinforcer resins and also
- optionally further polymers of preferably elastomeric type; elastomers which can be utilized accordingly include those based on pure hydrocarbons, as for example polybutadiene, elastomers with substantial chemical saturation, such as saturated ethylene-propylene copolymers, α-olefin copolymers, polyisobutylene, butyl rubber, ethylene-propylene rubber, for example, and also chemically functionalized hydrocarbons such as halogen-containing, acrylate-containing, allyl- or vinyl ether-containing polyolefins, for example.

It should be emphasized that the adhesive of the invention is antiozonant-free.

Explicit mention may be made of particularly advantageous embodiments of the invention:

A) Pressure-sensitive adhesive comprising, preferably consisting of
  a) an elastomer, the elastomer having a fraction of 40 wt % to 60 wt %, based on the adhesive composition, and an elastomer used comprising only polybutadiene block copolymers,
  b) a partly hydrogenated hydrocarbon resin (resin kind 1) having a softening temperature of at least 90° C., the tackifying resin having a fraction of 40 wt % to 60 wt %, based on the adhesive composition.

B) Pressure-sensitive adhesive comprising, preferably consisting of
  a) an elastomer, the elastomer having a fraction of 40 wt % to 60 wt %, based on the adhesive composition, and an elastomer used comprising only polybutadiene block copolymers,
  b) a nonhydrogenated hydrocarbon resin (resin kind 1) having a softening temperature of at least 90° C., the resin kind 1 having a fraction of 15 wt % to 30 wt %, based on the adhesive composition,
  c) a further tackifying resin of resin kind 2, having a softening temperature of at least 90° C., the resin kind 2 having a fraction of 15 wt % to 30 wt %, based on the adhesive composition.

C) Pressure-sensitive adhesive comprising, preferably consisting of
  a) an elastomer, the elastomer having a fraction of 40 wt % to 60 wt %, based on the adhesive composition, and an elastomer used comprising only polybutadiene block copolymers, b) a partly hydrogenated hydrocarbon resin (resin kind 1) having a softening temperature of at least 90° C., the resin kind 1 having a fraction of 30 wt % to 59 wt %, based on the adhesive composition,
c) a further tackifying resin of resin kind 2, having a softening temperature of at least 90° C., the resin kind 2 having a fraction of 1 wt % to 30 wt %, based on the adhesive composition.

Formulations of the invention have the following profile of properties:

| Property | Physical measurement parameter | Unit | Value (range) | Measurement method |
| --- | --- | --- | --- | --- |
| Cohesion | Tip-shear holding power | days (d) | >10 days, preferably >18 days | Test A |
| Adhesion | Peel rate | mm/24 h | <30 mm/24 h, preferably <20 mm/24 h | Test B |
| Detachment behavior | Stripping force | N/cm | <20 N/cm, preferably <15 N/cm | Test C |
| UV resistance | Susceptibility to tears after UV storage | % tears | ≤10%, preferably <3%, very preferably 0% | Test D |
| Color | Color value b* |  | >0, <5 (preferably <3) | Test E |
| Transparency | Haze | % | <6.0% (preferably <4.0, very preferably <2.5%) | Test F |
| Transparency | Total transmission | % | >85%, preferably >90% | Test F |
| Ozone resistance | Optical evaluation |  | No susceptible cracking | Test I |

Also part of the invention is a transparent adhesive strip which is detachable by extensive stretching and which is constructed carrierlessly from this pressure-sensitive adhesive. Production is preferably solvent-free. Solvent-containing processes, however, are also conceivable.

Typical product constructions are adhesive tapes (adhesive transfer tapes), adhesive sheets and diecuts (adhesive strips). Layer thicknesses are at least 25 μm, preferably at least 100 μm, and up to 2 mm. Very preferred layer thicknesses are between about 500 μm and about 800 μm. Diverse application possibilities are also conceivable for adhesive tapes between about 150 μm and about 400 μm.

Adhesive sheets can take on any desired extents in both dimensions. Adhesive tapes are, for example, 2 mm, 5 mm, 10 mm, 20 mm, or 50 mm wide. Adhesive tapes may be in the form of wound rolls.

The general expression "adhesive tape" encompasses, in the sense of this invention, all sheetlike structures such as two-dimensionally extended sheets or sheet sections, tapes with extended length and limited width, tape sections, diecuts, labels, and the like.

Diecuts typically have a length of at least 5 mm. Lengths may also be 10 mm, 20 mm, 50 mm, 100 mm, or more.

Widths are typically at least 2 mm. Widths may also be 5 mm, 10 mm, 20 mm, 50 mm, or more.

The diecuts are customarily longer than they are broad, with the stretching for redetachment in that case lying advantageously along the longitudinal axis. All angles of the diecuts may be 90° or deviations therefrom. Also possible are forms in which the diecut is tapered in at least one direction and in particular runs to a point. Edges may also be rounded.

Adhesive products, especially diecuts, may include grip tab regions, which are not tacky on the top and/or bottom face of the diecut.

This region serves as a grip tab, which is pulled in order to produce the extensive stretching especially in the bond plane, and is therefore nonadhesive preferably on both sides, as a result in particular of the application of foil or paper sections.

In another advantageous development, the region may be produced by irradiation, powdering, or neutralization of the adhesive. Alternatively, a varnish or a primer may be applied at the corresponding sites.

The surface, moreover, may be modified by chemical treatment such as etching, in order in each case to generate nonadhesive zones.

Adhesive products are provided in particular on a release liner (preferably siliconized paper or foil). The liner may be release-furnished on one side. In that case advantageously a second ply of a liner is used to mask the second surface (especially in the case of diecuts). The liner may also be release-furnished on both sides. In that case it is possible to operate with one liner ply (especially in the case of adhesive tapes).

Although the core of the invention lies clearly in the use of the PSAs of the invention in single-layer pressure-sensitive adhesive strips redetachable without residue or destruction by extensive stretching substantially in the bond plane, it would not do justice to the invention if the PSAs of the invention could not also be used in multilayer PSA strips. In product designs of this kind as well, the ozone stability of formulations according to the invention can be utilized advantageously.

The concept of the invention therefore also encompasses constructions having an extensible carrier in the middle of the adhesive strips, in which case the extensibility of the carrier must be sufficient to ensure detachment of the adhesive strip by extensive stretching. Serving for example as carriers may be highly stretchable films. Examples of extensible carriers which can be used advantageously are transparent versions from WO 2011/124782 A1, DE 10 2012 223 670 A1, WO 2009/114683 A1, WO 2010/077541 A1, WO 2010/078396 A1.

In the case of use in multilayer pressure-sensitive adhesive strips, PSAs of the invention may form the middle, the inner, and the outer layers of the adhesive strips.

Where adhesives of the invention are used as outer layers, internal layers may be constructed alternatively from adhesives based on styrene block copolymers saturated in the elastomer block, and on the basis of styrene block copolymers unsaturated in the elastomer block.

Single-sidedly pressure-sensitive adhesive strips may be obtained, for example, by rendering the pressure-sensitive adhesive strip inert on one side.

The fields of use already mentioned may also be actualized advantageously with the adhesive strips of the invention.

On account of the properties outlined, the adhesive strip of the invention may be used with outstanding effect for the bonding of an article on a hydrophilic surface.

Possible further applications of corresponding self-adhesive tapes are found in DE 42 33 872 A1, DE 195 11 288 A1, U.S. Pat. No. 5,507,464 A, U.S. Pat. No. 5,672,402 A and WO 94/21157 A1, specific embodiments, for example, in DE 44 28 587 A1, DE 44 31 914 A1, WO 97/07172 A1, DE 196 27 400 A1, WO 98/03601 A1, and DE 196 49 636 A1, DE 197 20 526 A1, DE 197 23 177 A1, DE 297 23 198 A1, DE 197 26 375 A1, DE 197 56 084 A1, DE 197 56 816 A1, DE 198 42 864 A1, DE 198 42 865 A1, WO 99/31193 A1, WO 99/37729 A1, and WO 99/63018 A1.

The adhesive strip of the invention can be used advantageously in an assembly where the adhesive strip is bonded between two substrates of which at least one is transparent and/or one substrate is designed in such a way that a load can be affixed thereto.

The transparent substrate(s) in this case may consist of glass or of plastics such as polycarbonates, poly(meth)acrylates, or polystyrenes.

The substrate suitable for accommodating a load may be a hook element. Preferably such a substrate is at the same time transparent.

Here, the tip-shear load starting from the substrate on account of the load is transferred to the adhesive strip.

Particularly advantageous versions of the invention are elucidated in more detail using the examples and figures described below, without thereby wishing to impose any unnecessary restriction on the invention.

BRIEF DESCRIPTION OF THE DRAWINGS

FIG. 1 shows the pressure-sensitive adhesive strip 10 of the invention wherein the core layer 1 consists of the adhesive of the invention, which is redetachable by extensive stretching particularly in the bond plane.

The core layer 1 has a region which serves as a grip tab, on which pulling takes place in order to effect the extensive stretching particularly in the bond plane of the core layer 1. This region is rendered nonpressure-sensitive adhesive on both sides by the application of preferably siliconized foil or paper sections 6.

Figure 2:
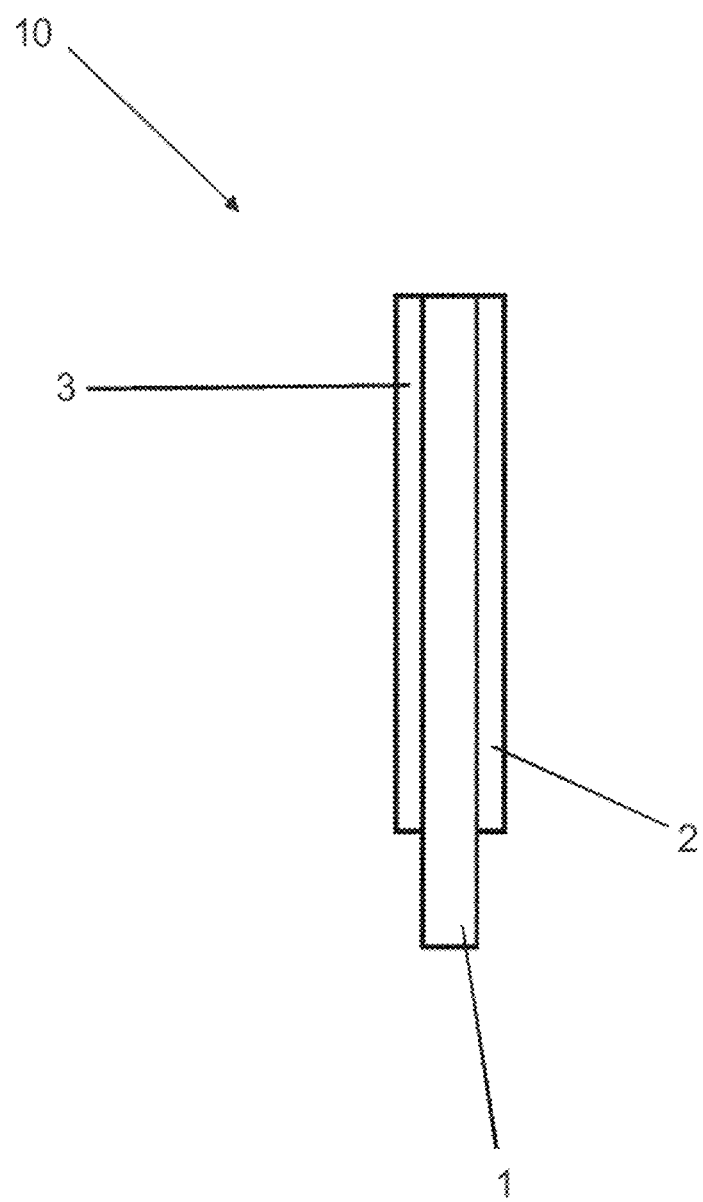

FIG. 2 shows the pressure-sensitive adhesive strip 10 of the invention wherein the core layer 1 consists of a carrier which is redetachable by extensive stretching particularly in the bond plane.

Applied on the carrier 1 are two adhesive layers 2, 3 of the invention, which preferably have the same composition.

Figure 1:
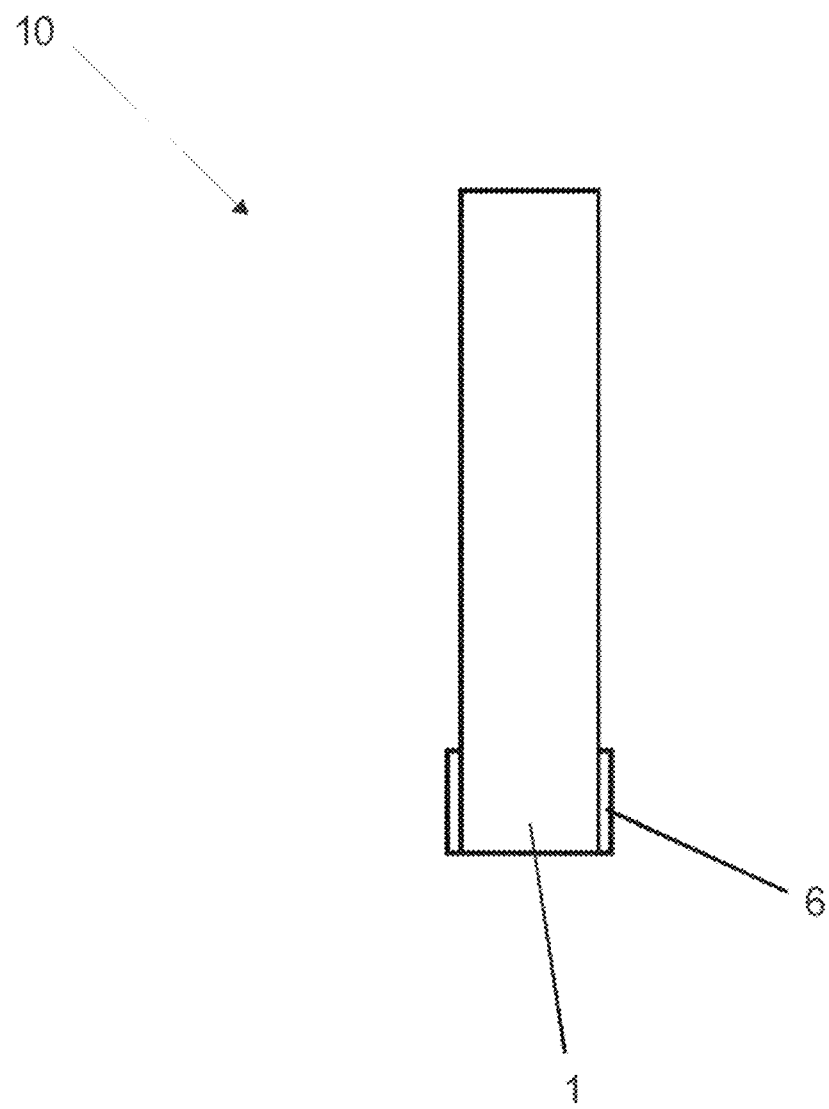
FIG. 1 shows the pressure-sensitive adhesive strip of the invention where the core layer consists of an adhesive and FIG. 2 shows the pressure-sensitive adhesive strip of the invention where the core layer consists of a carrier.
Figure 3:
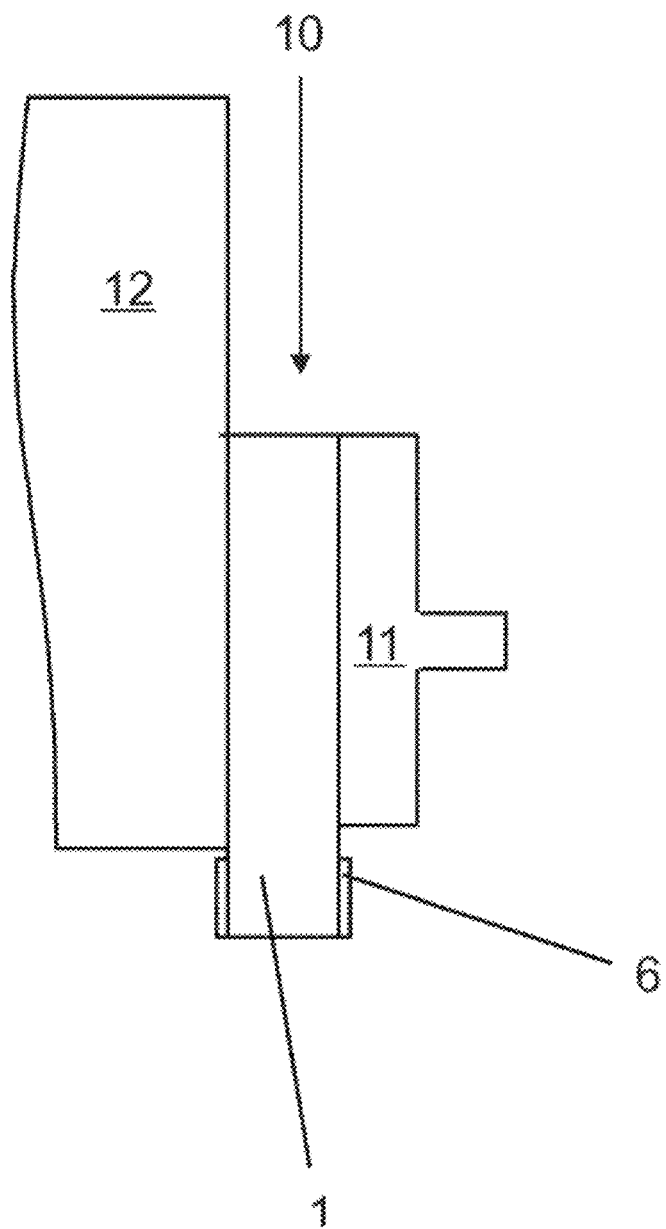
FIG. 3 shows how an article is bonded on a substrate using an adhesive strip as per FIG. 1.

FIG. 3 shows how an article 11 is bonded to a substrate 12—a hydrophilic substrate, for example—using an adhesive strip 10 as per FIG. 1. The article 11 is a hook. 11 and/or 12 may be transparent in configuration.

Figure 4:
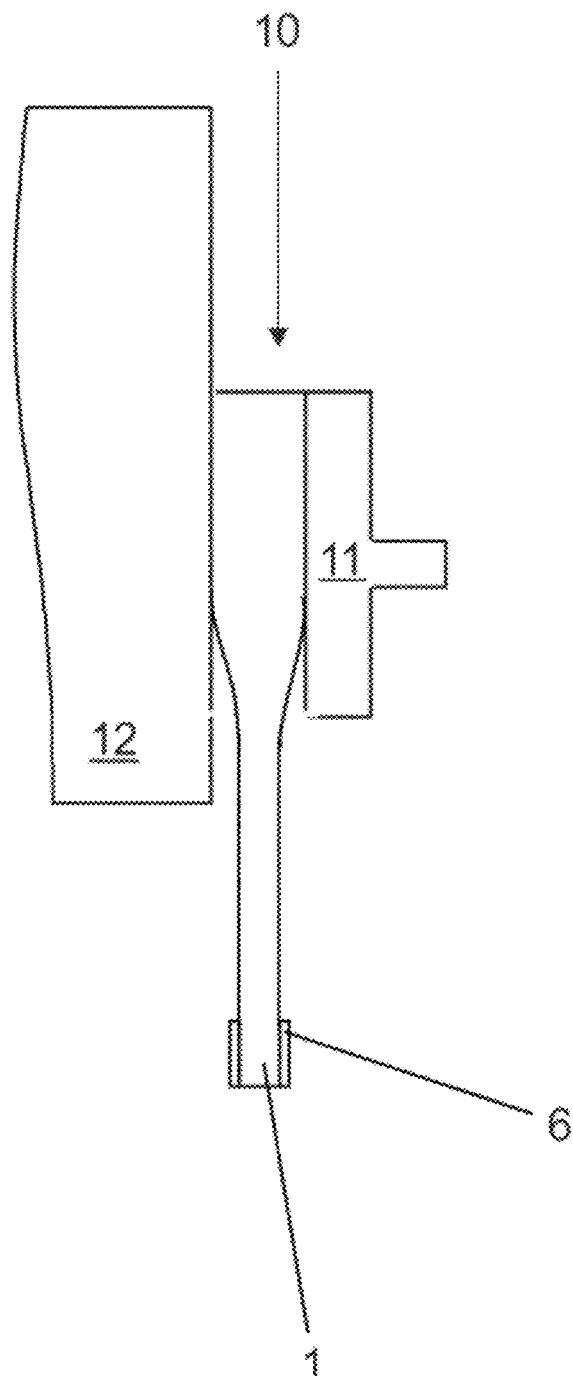
FIG. 4 shows the method for detaching the article bonded with the pressure-sensitive adhesive strip.

FIG. 4 shows the method for detaching the article 11 bonded with the pressure-sensitive adhesive strip 10.

Pulling takes place from the grip tab of the adhesive strip 10 in the direction of the bond plane, leading to stretching. On account of the stretching, the core layer loses bond strength, and parts from the substrate 12.

The stretching of the core layer 1 is continued until separation of the core layer 1 from the substrate 12 is complete.

Figure 5:
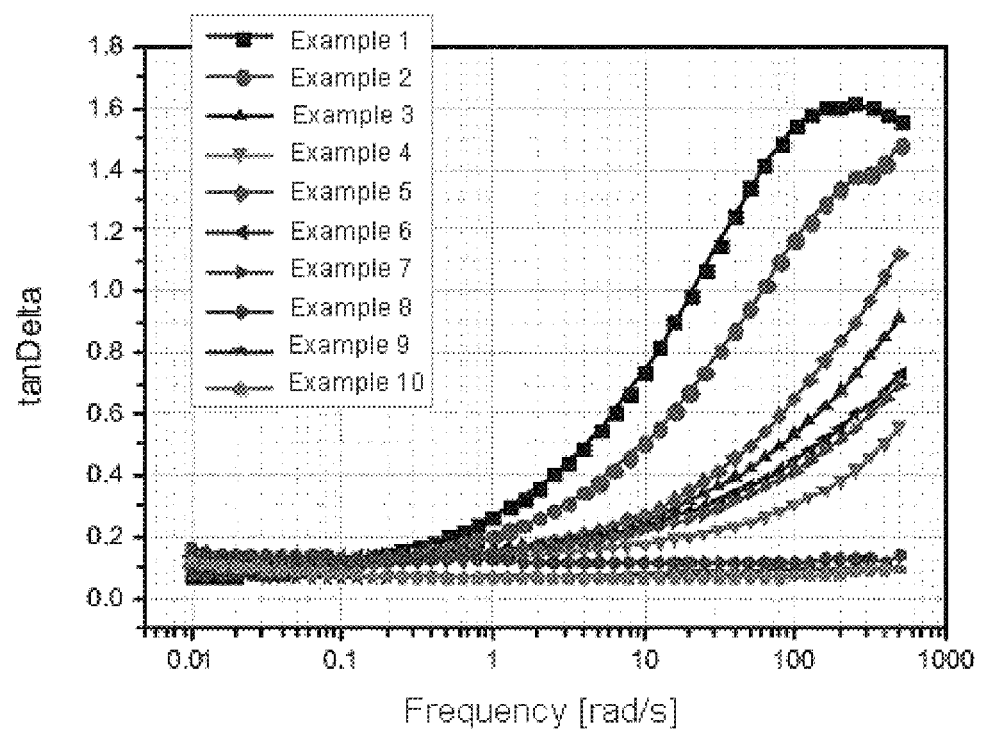
FIG. 5 shows dynamic-mechanical profiles of adhesives of the invention, and of materials/formulations employed for comparison.

FIG. 5 represents the measurement plots for examples 1 to 10, obtained according to test method J. From the data, the advantageous tan δ ranges can be read off.

Figure 6:
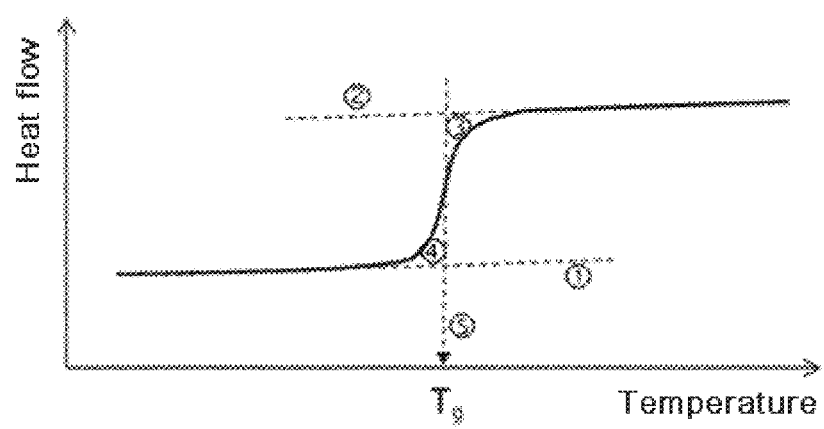
FIG. 6 shows the diagrammatic representation for evaluating a glass transition temperature by test L.

FIG. 6 shows, diagrammatically, the procedure for determining the glass transition temperature from a thermogram recorded according to test L.

TEST METHODS

Test A—Tip-Shear Holding Power

For determining the tip-shear strength, the sheet of adhesive under test, with dimensions of 20 mm×50 mm and provided at one end on both sides with a nonpressure-sensitively adhesive grip tab region (obtained by laminated application of 25 µm-thick, biaxially oriented polyester film with dimensions of 20 mm×13 mm), is bonded centrally to a polystyrene base plate with dimensions of 40 mm×20 mm×3 mm (length×width×thickness). Plugged onto the base plate is a steel pin 10 cm long, which sits vertically on the plate face. The specimens obtained are bonded with a force of 100 N to a glass plate (pressing time =5 sec) and left for 5 minutes in the unloaded state. Following application of the selected tip-shear load by the hanging-on of a weight (20 N with 50 mm lever arm), a record is made of the time taken for the bond to fail (i.e., the tip-shear holding power). The test conditions are 23° C. and a relative humidity of 50%. For many applications, the higher the tip-shear holding power, the better.

Test B—Peel Rate

For the determination of the peel strength, the pressure-sensitive adhesive strip specimens under investigation, with dimensions of 20 mm×50 mm, are lined by lamination over the whole area, without air bubbles, with a PET film 23 µm thick, after which the second side of the adhesive-sheet strip is lined at one end with a film strip approximately 10 mm long, to produce at this end a grip tab region which is nonpressure-sensitively adhesive on both sides. Thereafter, the adhesive-sheet strip under test is adhered by its facing side, with gentle applied finger pressure, to the test substrate (coated woodchip wallpaper: wallpaper=Erfurt Körnung 52, color=alpina white, wallpaper bonded to chipboard panel). The specimens are then pressed for 10 seconds under an applied pressure of 100 N per 10 cm² of pressure-sensitive adhesive surface, followed by conditioning at 40° C. for 15 minutes. The test panels are subsequently fixed horizontally, with the grippable region of the adhesive strips pointing downward. A clip (20 g) is used to fasten a weight of 50 g to the nonadhesive grip tab, and so the resulting peeling load (approximately 0.7 N per 20 mm of adhesive-strip width) acts orthogonally to the bond plane. After 15 minutes and after a further 24 hours, a mark is made of the distance traveled in peel by the adhesive strip from the bond substrate from the beginning of the test. The distance between the two marks is reported as peel travel (units: mm per 24 h). For many applications, the lower the peel travel, the better.

Test C—Stripping Force

For the determination of the detachment force (stripping force), a sheet of adhesive with dimensions of 50 mm*20 mm (length*width), with nonpressure-sensitively adhesive grip tab region at the top end, is bonded centrally between two steel plates (arranged congruently to one another) with dimensions of 50 mm×30 mm. The specimens thus obtained are pressed on with a force of 500 N for 5 seconds, after which they are left in the unloaded state for 5 minutes. The steel plates each have a bore at their bottom end to accommodate an S-shaped steel hook. The bottom end of the steel hook carries a further steel plate, which allows the test arrangement to be fixed for measurement in the lower jaw of a tensile testing machine. The bonds are stored at +40° C. for 24 hours. After reconditioning to RT, the adhesive-sheet strip is removed at a pulling speed of 1000 mm/min parallel to the bond plane and without contact with the edge regions of the two steel plates. During this procedure, the required detachment force in N is recorded. The parameter reported is the maximum of the stripping stress values in N/cm.

Test D—UV Resistance

In order to test the UV resistance, 10 adhesive strips of each sheet of adhesive under test, in dimensions of 20 mm×50 mm, provided at one end on both sides with a nonpressure-sensitively adhesive grip tab region (obtained by laminating application of 25 μm-thick, biaxially oriented polyester film of dimensions 20 mm×13 mm), are bonded between two glass plates. The bond is made such that the grip tab protrudes from the bondline by 10 mm. Prior to the application of the second glass plate, each adhesive strip is pressed on with a force of 100 N. The adhesive strips are then irradiated for seven days with a sunlight lamp (Osram Ultra Vitalux 300 W) through the glass plate from a distance of 80 cm. The test temperature is 25° C. After the seven day storage, the adhesive strips are parted by pulling, with pulling taking place at an angle of 15°. The number of torn adhesive strips is recorded. The result is reported in % torn adhesive strips.

Test E—Color Value b*

The procedure is as per DIN 6174, and the color characteristics are investigated in the CIELab three-dimensional space, formed by the three color parameters L*, a* and b*. This is done using a BYK Gardener spectro-guide instrument, equipped with a D/65° lamp. Within the CIELab system L* indicates the gray value, a* the color axis from green to red, and b* the color axis from blue to yellow. The positive value range for b* indicates the intensity of the yellow color component. A white ceramic tile with a b* of 1.68 was used as reference. This tile also serves as a sample holder, onto which the adhesive layer under test is laminated. Colorimetry takes place on the pure adhesive layer at a thickness of 650 μm in each case, after the adhesive layer has been freed from the release liners.

Test F—Haze (Large-Angle Scattering), Transmission

The transparency or degree of transmittance, occasionally also referred to merely as transmission for short, and expressed generally in %, is the ratio of the luminous power arriving at the reverse face of a body through which light is irradiated, to the luminous power incident on the front face. Transmission is curtailed by reflection and possibly absorption.

The equation is therefore as follows: transmittance=(1−reflectance−absorptance). Transmission and haze are determined in accordance with ASTM D1003 on a haze-gard plus from Byk-Gardner. The procedure for this was that of ASTM D1003.

For the measurement of large-angle scattering and transmission, the adhesive strip is first adhered without bubbles to a glass microscopy slide precleaned with isopropanol (VWR, ECN 631-1552, #201107). Thereafter a PET film 50 μm thick (Melinex® 401, DuPont Teijin Films) is laminated on using a manual roller, with strict attention paid to absence of bubbles and absence of dust. The resulting laminate is stored at 60° C. for 3 days and then subjected to measurement.

Test G—Molecular Weight Determination

The weight-average molecular weight $M_w$ was determined by gel permeation chromatography (GPC). The eluent used was THF, measurement took place at 23° C. The precolumn used was PSS-SDV, 5 μ, $10^3$ Å, ID 8.0 mm×50 mm. Separation took place using the columns PSS-SDV, 5 μ, $10^3$ and also $10^4$ and $10^6$ each with ID 8.0 mm×300 mm. The sample concentration was 4 g/l, the flow rate 1.0 ml per minute. Measurement took place against PS standards. (μ=μm; 1Å=$10^{-10}$ m).

Test H—Tackifier Resin Softening Temperature

The tackifier resin softening temperature is carried out according to the relevant methodology, which is known as Ring & Ball and is standardized according to ASTM E28.

Test I—Ozone Resistance

Figure 7:
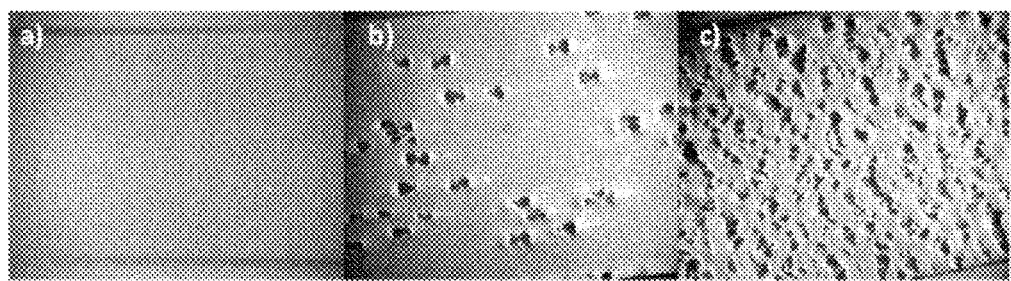
FIG. 7 shows micrographs of adhesive sheets after the ozone test. a) No ozone damage b) slight ozone damage c) severe ozone damage

A suitable pen is used to mark two parallel lines 6 cm apart on a stoneware tile (V&B Fliesen GmbH, Rotensteiner Weg, 66663 Merzig, article No. 1106TW02). Thereafter a distance of 3 cm in length is drawn in on a sheet of adhesive with dimensions of 50 mm×20 mm (length×width) in the longitudinal direction. The adhesive sheet is then stretched to exactly twice its length and in the extended condition is fixed on the stoneware tile in such a way that the markings on adhesive sheet and tile overlap. The adhesive film is lined with release foil and pressed on the tile with a 2 kg roller-applied weight, so that the tension of the adhesive sheet is retained. The sample has its liner removed again, and is then stored open for 72 hours at 25° C. and an ozone concentration of 50 pphm in an ozone test chamber (conditioning chamber WK3-180/0 from Weiss Unwelttechnik GmbH with ozone testing unit SIM 6000 from Anseros Klaus Nonnenmacher GmbH). When the storage time is over, the specimens are evaluated under a direct light microscope (magnification factor 6.5). Border specimens are shown in FIG. 7.

The specimens are considered ozone-resistant if there is no perceptible damage (cracks, holes, clouding) of the specimen. Appearance of this kind is shown in FIG. 1a.

Test J—DMA

The dynamic glass transition temperature data are based on the determination by means of dynamic-mechanical analysis (DMA) at low frequencies (frequency sweep; measuring range: 0.01 to 512 rad/s; temperature: 25° C.; deformation 1%; Rheometric ARES class; parallel plate arrangement, sample thickness 1 mm: sample diameter 25 mm: measuring head: 2000 g spring-mounted with standard force (2 k Bendix)).

Test K—Melt Viscosity

For the determination of the melt viscosity of the plasticizing resins, a shear stress sweep was carried out in a shear stress-controlled DSR 200 N rheometer from Rheometrics Scientific, in rotation. A cone/plate measuring system with a diameter of 25 mm (cone angle 0.1002 rad) was employed; the measuring head was air-mounted and suitable for standard force measurements. The slot was 0.053 mm and the measuring temperature 25° C. The frequency was varied from 0.002 Hz to 200 Hz, and the melt viscosity at 1 Hz was recorded.

Test L—DSC

The glass transition temperature of polymer blocks in block copolymers was determined by means of dynamic scanning calorimetry (DSC). For this purpose about 5 mg of the untreated block copolymer samples were weighed into an aluminum crucible (volume 25 µl) and closed with a perforated lid. For the measurement, a DSC 204 F1 from Netzsch was used, and was operated under nitrogen for inertization. The sample was cooled first to −150° C., then heated at a heating rate of 10 K/min up to +150° C., and cooled again to −150° C. The subsequent second heating curve was run again at 10 K/min and the change in the heat capacity was recorded. Glass transitions are identified as steps in the thermogram. The glass transition temperature is evaluated as follows (see FIG. 6). A tangent is applied in each case to the baseline of the thermogram before ① and after ② of the step. In the region of the step, a balancing line ⑤ is placed parallel to the ordinate in such a way that it intersects the two tangents, specifically so as to form two areas ③ and ④ of equal content (between each tangent, the balancing line, and the measuring plot). The point of intersection of the balancing lines thus positioned with the measuring plot gives the glass transition temperature.

EXAMPLES

In the text below, the invention is elucidated in more detail by a number of examples.

Preparation of Specimens

All of the kneading compounds were produced in a Küpper model III-P1 heatable double-sigma kneader from Aachener Maschinenbau. The jacket of the kneader was heated by a thermal oil heating bath from Lauda. A bath temperature of 190° C. was set here. Throughout the kneading operation, there was an inert gas atmosphere of $CO_2$. The kneader was operated at 50 rpm.

First of all the elastomers were weighed out together with the solid aging inhibitors Irganox 3052 and Irgafos 168 (if present in the particular formula), and charged to the kneader. Thereafter about 10% of the amount of solid resin was added, and kneading took place for 15 minutes. Subsequently, at intervals of 10 minutes, one third each of the remaining amount of tackifying resin 1, tackifying resin 2 (if present in the particular formula), plasticizing resin, and the liquid aging inhibitors and/or light stabilizers (Weston 399 and Tinuvin products, respectively) were added and incorporated.

After the end of the kneading operation, the kneading compounds were taken from the kneader and allowed to cool to room temperature.

The cooled compositions were placed between two plies of siliconized release paper and pressed to hand specimens with a layer thickness of 650 µm, using a hot press from Lauffer GmbH & CO KG, model RLKV 25, at 130° C.

Example 1—Comparative

| | | | wt. % |
|---|---|---|---|
| Elastomer | Kraton D1165 PT | polystyrene-polyisoprene block copolymer | 24.00% |
| Tackifying resin 1 | Dercolyte A115 | nonhydrogenated hydrocarbon resin | 47.00% |
| Tackifying resin 2 | -/- | | |
| Plasticizing resin | Wingtack 10 | aliphatic hydrocarbon resin | 3.50% |
| Further constituents | Kraton D1102 CS | polystyrene-polybutadiene block copolymer | 24.00% |
| | Tinuvin 571 | | 0.50% |
| | Irganfos 168 | | 0.50% |
| | Irganox 3052 | | 0.50% |

Example 2—Comparative

| | | | wt. % |
|---|---|---|---|
| Elastomer | Kraton D1102 CS | polystyrene-polybutadiene block copolymer | 39.00% |
| Tackifying resin 1 | Dercolyte A115 | nonhydrogenated hydrocarbon resin | 45.00% |
| Tackifying resin 2 | -/- | | |
| Plasticizing resin | Wingtack 10 | aliphatic hydrocarbon resin | 4.50% |
| Further constituents | Kraton D1118 CS | polystyrene-polybutadiene block copolymer | 10.00% |
| | Tinuvin 571 | UV stabilizer | 0.50% |
| | Weston 399 | antioxidant | 0.50% |
| | Irganox 3052 | antioxidant | 0.50% |

Example 3—Comparative

| | | | wt. % |
|---|---|---|---|
| Elastomer | Kraton D1102 CS | polystyrene-polybutadiene block copolymer | 38.00% |
| Tackifying resin 1 | Sukorez SU110 | fully hydrogenated hydrocarbon resin | 23.50% |
| Tackifying resin 2 | Sukorez SU100 | fully hydrogenated hydrocarbon resin | 23.50% |
| Plasticizing resin | Wingtack 10 | aliphatic hydrocarbon resin | 3.50% |
| Further constituents | Kraton D1118 CS | polystyrene-polybutadiene block copolymer | 10.00% |
| | Tinuvin 571 | UV stabilizer | 0.50% |
| | Tinuvin 765 | antioxidant | 0.50% |
| | Irganox 3052 | antioxidant | 0.50% |

Example 4—Comparative

| | | | wt. % |
|---|---|---|---|
| Elastomer | Kraton D1102 CS | polystyrene-polybutadiene block copolymer | 39.00% |
| Tackifying resin 1 | Regalite R1100 | fully hydrogenated hydrocarbon resin | 30.00% |
| Tackifying resin 2 | Foral AX | fully hydrogenated rosin | 16.00% |

-continued

| | | | wt. % |
|---|---|---|---|
| Plasticizing resin | Wingtack 10 | aliphatic hydrocarbon resin | 3.50% |
| Further constituents | Kraton D1118 CS | polystyrene-polybutadiene block copolymer | 10.00% |
| | Tinuvin 571 | UV stabilizer | 0.50% |
| | Tinuvin 765 | antioxidant | 0.50% |
| | Irganox 3052 | antioxidant | 0.50% |

Example 5—Inventive

| | | | wt. % |
|---|---|---|---|
| Elastomer | Kraton D1102 CS | polystyrene-polybutadiene block copolymer | 38.00% |
| Tackifying resin 1 | Regalite R7100 | partially hydrogenated hydrocarbon resin | 32.00% |
| Tackifying resin 2 | Piccolyte A115 | nonhydrogenated hydrocarbon resin | 15.00% |
| Plasticizing resin | Wingtack 10 | aliphatic hydrocarbon resin | 3.50% |
| Further constituents | Kraton D1118 CS | polystyrene-polybutadiene block copolymer | 10.00% |
| | Tinuvin 571 | UV stabilizer | 0.50% |
| | Tinuvin 765 | antioxidant | 0.50% |
| | Irganox 3052 | antioxidant | 0.50% |

Example 6—Inventive

| | | | wt. % |
|---|---|---|---|
| Elastomer | Kraton D1102 CS | polystyrene-polybutadiene block copolymer | 38.00% |
| Tackifying resin 1 | Regalite R7100 | partially hydrogenated hydrocarbon resin | 37.00% |
| Tackifying resin 2 | Regalite S5090 | partially hydrogenated hydrocarbon resin | 10.00% |
| Plasticizing resin | Wingtack 10 | aliphatic hydrocarbon resin | 3.50% |
| Further constituents | Kraton D1118 CS | polystyrene-polybutadiene block copolymer | 10.00% |
| | Tinuvin 571 | UV stabilizer | 0.50% |
| | Tinuvin 765 | antioxidant | 0.50% |
| | Irganox 3052 | antioxidant | 0.50% |

Example 7—Comparative

| | | | wt. % |
|---|---|---|---|
| Elastomer | Kraton D1102 CS | polystyrene-polybutadiene block copolymer | 30.00% |
| Tackifying resin 1 | Ragalite R7100 | partially hydrogenated hydrocarbon resin | 47.00% |
| Tackifying resin 2 | Arkon M90 | partially hydrogenated hydrocarbon resin | 13.00% |
| Plasticizing resin | Wingtack 10 | aliphatic hydrocarbon resin | 3.50% |
| Further constituents | Kraton D1118 CS | polystyrene-polybutadiene block copolymer | 5.00% |
| | Tinuvin 571 | UV stabilizer | 0.50% |
| | Tinuvin 765 | antioxidant | 0.50% |
| | Irganox 3052 | antioxidant | 0.50% |

Example 8—Comparative

| | | | wt. % |
|---|---|---|---|
| Elastomer | Kraton D1118 CS | polystyrene-polybutadiene block copolymer | 98.50% |
| Tackifying resin 1 | -/- | | |
| Tackifying resin 2 | -/- | | |
| Plasticizing resin | -/- | | |
| Further constituents | Tinuvin 571 | UV stabilizer | 0.50% |
| | Tinuvin 765 | antioxidant | 0.50% |
| | Irganox 3052 | antioxidant | 0.50% |

Example 9—Comparative

| | | | wt. % |
|---|---|---|---|
| Elastomer | Kraton D1165 PT | polystyrene-polyisoprene block copolymer | 98.50% |
| Tackifying resin 1 | -/- | | |
| Tackifying resin 2 | -/- | | |
| Plasticizing resin | -/- | | |
| Further constituents | Tinuvin 571 | UV stabilizer | 0.50% |
| | Tinuvin 765 | antioxidant | 0.50% |
| | Irganox 3052 | antioxidant | 0.50% |

Example 10—Comparative

| | | | wt. % |
|---|---|---|---|
| Elastomer | Kraton D1102 CS | polystyrene-polybutadiene block copolymer | 98.50% |
| Tackifying resin 1 | -/- | | |
| Tackifying resin 2 | -/- | | |
| Plasticizing resin | -/- | | |
| Further constituents | Tinuvin 571 | UV stabilizer | 0.50% |
| | Tinuvin 765 | antioxidant | 0.50% |
| | Irganox 3052 | antioxidant | 0.50% |

Measurement Values

| Example | Tip-shear holding power | Peel rate | Stripping test | UV resistance | Haze | Transmission | Color value b* | tan δ 25° C., 10 rad/s | tan δ 25° C., 100 rad/s | Ozone resistance |
|---|---|---|---|---|---|---|---|---|---|---|
| #1 | >18 | 4 | 11 | 90% | 5.25 | 90.0 | 16.14 | 0.73 | 1.55 | Slight damage |
| #2 | >18 | 8 | 10 | 0% | 3.20 | 90.0 | 13.11 | 0.49 | 1.15 | No damage |
| #3 | >18 | >40 | 8 | 0% | 5.55 | 90.5 | 2.33 | 0.25 | 0.53 | No damage |
| #4 | >18 | 14 | 8 | 60% | 3.39 | 91.0 | 4.17 | 0.17 | 0.30 | Massive damage |
| #5 | >18 | 11 | 11 | 0% | 5.78 | 89.7 | 3.98 | 0.26 | 0.65 | No damage |
| #6 | >18 | 15 | 11 | 10% | 3.82 | 90.9 | 3.17 | 0.24 | 0.45 | No damage |
| #7 | 2 | 6 | x | x | 17.97 | 90.7 | 2.09 | 0.22 | 0.42 | Slight damage |
| #8 | x | x | x | x | x | x | x | 0.11 | 0.11 | Massive damage |
| #9 | x | x | x | x | x | x | x | 0.08 | 0.08 | Massive damage |
| #10 | x | x | x | x | x | x | x | 0.06 | 0.06 | Massive damage |

The invention claimed is:

1. A single- or double-sidedly bonding adhesive-sheet strip, which is carrier-free and hence of only single-ply configuration, comprising a pressure-sensitive adhesive composition at least comprising:
   (a) at least one elastomer, the elastomer having a fraction of at least 40 wt %, based on the total adhesive composition, and elastomer used comprising at least one kind of a polybutadiene block copolymer that is not hydrogenated in the polybutadiene block;
   (b) at least one partly hydrogenated hydrocarbon resin (tackifying resin kind 1) having a softening temperature of at least 90° C.;
   (c) a plasticizing resin or plasticizing resin mixture present at a fraction of not more than 6 wt %, based on a total of the pressure-sensitive adhesive composition and having a softening temperature of <25° C.;
   (d) optionally at least one further hydrocarbon resin, a terpene-phenolic resin and/or a rosin having a softening temperature of at least 90° C. (tackifying resin kind 2);
   (e) optionally further additives,
   wherein the tan δ of the pressure-sensitive adhesive composition at application temperature (here 25° C.) at 10 rad/s is at least 0.20 and at 100 rad/s is at least 0.40, and at 10 rad/s is not more than 0.40 and at 100 rad/s is not more than 1.00.

2. The single- or double-sidedly bonding adhesive-sheet strip according to claim 1, wherein the plasticizing resin or plasticizing resin mixture has a melt viscosity at 25° C. and 1 Hz of at least 25 Pa*s.

3. The single- or double-sidedly bonding adhesive-sheet strip according to claim 1, wherein the fraction of the polybutadiene block copolymer or of the mixture of different polybutadiene block copolymers in the elastomer is at least 90 wt %, based on the total elastomer amount.

4. The single- or double-sidedly bonding adhesive-sheet strip according to claim 1, at least one polybutadiene block copolymer is a triblock copolymer or a higher multiblock copolymer having at least two A blocks.

5. The single- or double-sidedly bonding adhesive-sheet strip according to claim 1, wherein the polybutadiene block copolymers have a polyvinylaromatic fraction of 20 wt % to 40 wt %.

6. The single- or double-sidedly bonding adhesive-sheet strip according to claim 1, wherein the fraction of the polybutadiene block copolymers, in total, based on the overall pressure-sensitive adhesive, is at least 40 wt %, and the maximum fraction of the polybutadiene block copolymers, in total, based on the total adhesive composition, is not more than 60 wt %.

7. The single- or double-sidedly bonding adhesive-sheet strip according to claim 1, wherein elastomer used comprises an elastomer mixture consisting of A-B-A triblock copolymer and A-B diblock copolymer, the fraction of A-B-A triblock copolymer, based on the total amount of elastomer used, being at least 50 wt %.

8. The single- or double-sidedly bonding adhesive-sheet strip according to claim 1, wherein the total tackifying resin content in the pressure-sensitive adhesive composition is at least 30 wt %, and not more than 60 wt %.

9. The single- or double-sidedly bonding adhesive-sheet strip according to claim 1, wherein the fraction of tackifying resin kind 1 is at least 25 wt % and not more than 60 wt %, based on the total adhesive composition.

10. The single- or double-sidedly bonding adhesive-sheet strip according to claim 1, wherein the adhesive-sheet strip is redetachable without residue or destruction by extensive stretching substantially in the bond plane.

11. The single- or double-sidedly bonding adhesive-sheet strip according to claim 1, wherein the adhesive-sheet strip is transparent and the total transmission of the adhesive-sheet strip is >85%.

12. The single- or double-sidedly bonding adhesive-sheet strip according to claim 1, wherein the adhesive-sheet strip is ozone resistant.

13. The single- or double-sidedly bonding adhesive-sheet strip according to claim 1, wherein the plasticizing resin is a hydrocarbon-based or a rosin-based plasticizing resin.

14. A method comprising:
   bonding an article to a hydrophilic surface wherein said article is bonded to said hydrophilic surface with the adhesive-sheet strip, according to claim 1, or bonding the adhesive-sheet strip, according to claim 1, between two substrates, of which at least one is transparent and/or one substrate is designed in such a way that a load can be affixed thereto.

15. The method according to claim 14, further comprising:
  detaching the adhesive-sheet strip, without residue or destruction, by extensively stretching substantially in a bond plane of the adhesive-sheet strip.

16. A single- or double-sidedly bonding adhesive-sheet strip, which is carrier-free and hence of only single-ply configuration, comprising a pressure-sensitive adhesive composition at least comprising:
  (a) at least one elastomer, the elastomer having a fraction of at least 40 wt %, based on the total adhesive composition, and elastomer used comprising at least one kind of a polybutadiene block copolymer that is not hydrogenated in the polybutadiene block;
  (b) at least one nonhydrogenated hydrocarbon resin (tackifying resin kind 1) having a softening temperature of at least 90° C.;
  (c) at least one further resin comprising at least partly hydrogenated or disproportionated hydrocarbon resin, terpene-phenolic resin and/or rosin having a softening temperature of at least 90° C. (tackifying resin kind 2);
  (d) a plasticizing resin or plasticizing resin mixture present at a fraction of not more than 6 wt %, based on a total of the pressure-sensitive adhesive composition and having a softening temperature of 25° C.; and
  (e) optionally further additives,
  wherein the tan δ of the pressure-sensitive adhesive composition at application temperature (here 25° C.) at 10 rad/s is at least 0.20 and at 100 rad/s is at least 0.40, and at 10 rad/s is not more than 0.40 and at 100 rad/s is not more than 1.00.

17. The single- or double-sidedly bonding adhesive-sheet strip according to claim 16, wherein the plasticizing resin or plasticizing resin mixture has a melt viscosity at 25° C. and 1 Hz of at least 25 Pa*s.

18. The single- or double-sidedly bonding adhesive-sheet strip according to claim 16, wherein the adhesive-sheet strip is redetachable without residue or destruction by stretching in the bond plane.

19. The single- or double-sidedly bonding adhesive-sheet strip according to claim 16, wherein the adhesive-sheet strip is transparent and the total transmission of the adhesive-sheet strip is >85%.

20. The single- or double-sidedly bonding adhesive-sheet strip according to claim 16, wherein the adhesive-sheet strip is ozone resistant.

21. The single- or double-sidedly bonding adhesive-sheet strip according to claim 16, wherein the plasticizing resin is a hydrocarbon-based or a rosin-based plasticizing resin.

22. The single- or double-sidedly bonding adhesive-sheet strip according to claim 16, wherein the fraction of tackifying resin kind 1 is at least 15 wt % and not more than 30 wt %, based on the total adhesive composition.

* * * * *